United States Patent
Xie

(10) Patent No.: US 8,851,117 B2
(45) Date of Patent: Oct. 7, 2014

(54) MEMS VALVE OPERATING PROFILE

(75) Inventor: Zhe Xie, Rochester, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 417 days.

(21) Appl. No.: 13/361,423

(22) Filed: Jan. 30, 2012

(65) Prior Publication Data

US 2013/0192704 A1 Aug. 1, 2013

(51) Int. Cl.
*F16K 11/065* (2006.01)

(52) U.S. Cl.
USPC .................. 137/625.48; 137/625.25

(58) Field of Classification Search
USPC ........................ 137/625.25, 625.27, 625.48
See application file for complete search history.

(56) References Cited

U.S. PATENT DOCUMENTS

| | | | |
|---|---|---|---|
| 6,540,203 B1 * | 4/2003 | Hunnicutt | 251/26 |
| 6,694,998 B1 * | 2/2004 | Hunnicutt | 137/116.3 |
| 6,761,420 B2 * | 7/2004 | Maluf et al. | 303/119.2 |
| 6,845,962 B1 * | 1/2005 | Barron et al. | 251/129.06 |
| 8,011,388 B2 | 9/2011 | Fuller et al. | |
| 8,113,482 B2 * | 2/2012 | Hunnicutt | 251/31 |
| 8,156,962 B2 * | 4/2012 | Luckevich | 137/625.6 |
| 2010/0038576 A1 * | 2/2010 | Hunnicutt | 251/318 |

* cited by examiner

Primary Examiner — John Fox

(57) ABSTRACT

A MEMS fluid control system is provided having a microelectro-mechanical system. The system includes a plurality of ports, a cavity, a valve, an actuator, and a pair of electrical contacts. The plurality of ports are in communication with the cavity, the valve is disposed in the cavity, and the valve is connected to the actuator. The system further includes a hydraulic circuit having a pressure supply line in communication with a first of the plurality of ports, a control line in communication with a second of the plurality of ports, and an exhaust line in communication with a third of the plurality of ports. The valve includes an elongated portion and a blocking portion, the blocking portion includes a first, a second, and a third portions.

16 Claims, 4 Drawing Sheets

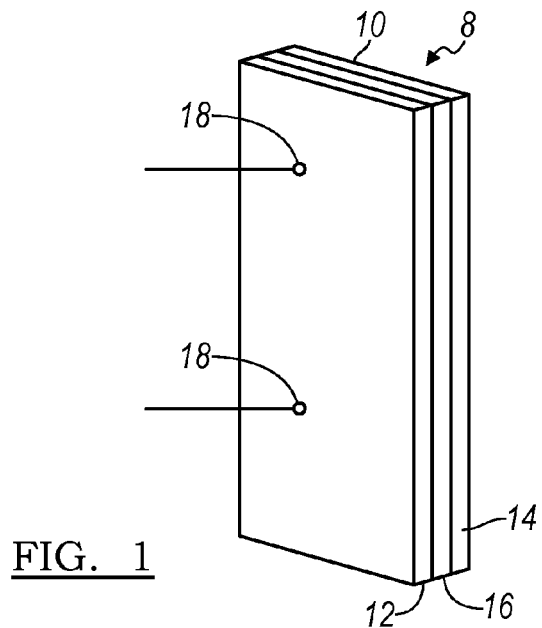
FIG. 1
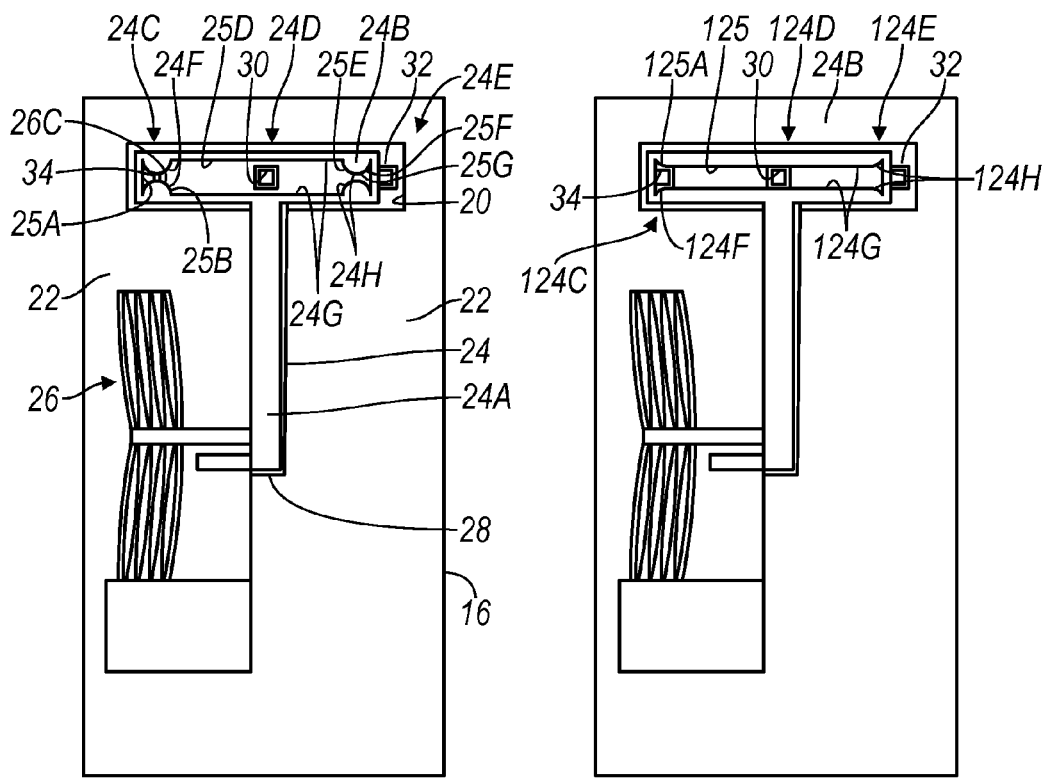
FIG. 2A
FIG. 2B

MEMS VALVE OPERATING PROFILE

FIELD

The present disclosure relates generally to micro-electronic-mechanical system (MEMS) and more specifically to valve profiles for achieving a tailored output response from a MEMS valve.

BACKGROUND

The statements in this section merely provide background information related to the present disclosure and may or may not constitute prior art.

A typical micro-electro-mechanical system (MEMS) control valve is a micro valve incorporated on a silicon substrate using microfabrication technology. These systems have both mechanical and electrical components with features measuring in the micrometer range. Various micro valve devices have been used for controlling fluid flow within a fluid circuit. A typical micro valve device includes a movable valve supported by a fixed body portion of the device and operatively coupled to an actuator. The movable valve is capable of alternatively blocking ports in response to electrical signals provided to the micro valve which produces a hydraulic signal response.

In previous applications, the hydraulic pressure response provided by the micro valve has been suited for the requirements of the application. However, when utilizing the micro valve technology in further applications, the nature of the application has required more accurate fluid pressure signals which have not been achievable using the current linear valve position inputs. As a result, there is a need for a method of optimizing the fluid pressure response of a micro valve when utilized in applications requiring such a response.

Accordingly, there is room in the art for a method of optimizing the fluid pressure response of a micro valve when utilized in applications requiring such a response.

SUMMARY

A micro-electro-mechanical fluid control device is provided, the device including a first, a second, and an intermediate plate. The intermediate plate is disposed between the first and second plates. The first plate includes a pair of electrical contact cavities. The second plate includes a first, a second and a third ports. The intermediate plate includes a valve, a valve cavity, and an actuator. The first, second, and third ports are in communication with the valve cavity. The valve is disposed in the cavity. The valve is connected to the actuator. The valve includes an elongated portion and a blocking portion and the blocking portion includes a first, a second, and a third portions.

In another example of the present invention, the first portion of the blocking portion includes a first and a second convex surface and a first planar surface. The first convex surface is opposite the second convex surface and the first and second convex surfaces are connected by the first planar surface.

In yet another example of the present invention, the second portion of the blocking portion includes a second and a third planar surfaces. The second planar surface is connected to the first convex surface, and the third planar surface is connected to the second convex surface.

In yet another example of the present invention, the third portion of the blocking portion includes a third and fourth convex surfaces and a fourth planar surface. The third convex surface is opposite the fourth convex surface, the third and fourth convex surfaces are connected by the fourth planar surface, the third convex surface is connected to the second planar surface, and the fourth convex surface is connected to the third planar surface.

In yet another example of the present invention, the first portion of the blocking portion includes a first fluid passage in selective communication with the first port.

In yet another example of the present invention, the second portion of the blocking portion includes a second fluid passage and the second fluid passage is in communication with the first fluid passage and the second port.

In yet another example of the present invention, the third portion of the blocking portion includes a third fluid passage, the third fluid passage is in communication with the second fluid passage, and the third fluid passage is in selective communication with the third port.

In yet another example of the present invention, the first portion of the blocking portion includes a flow area defined by the following equation:

$$A1 = \frac{H\left(1 - \sqrt{\frac{1}{kX} - 1}\right)}{2 - \frac{1}{kX}}$$

wherein H represents a total flow area for the first and second portions, k is a constant for the valve design, and X is the distance in a direction of movement of the blocking portion.

In yet another example of the present invention, the third portion of the blocking portion includes a flow area defined by the following equation:

$$A2 = H - A1.$$

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 1 is a perspective view of a MEMS device;

FIG. 2A is a plan view of a microvalve associated with the MEMS device;

FIG. 2B is a plan view of another microvalve associated with the MEMS device;

DETAILED DESCRIPTION

Figure 3A:
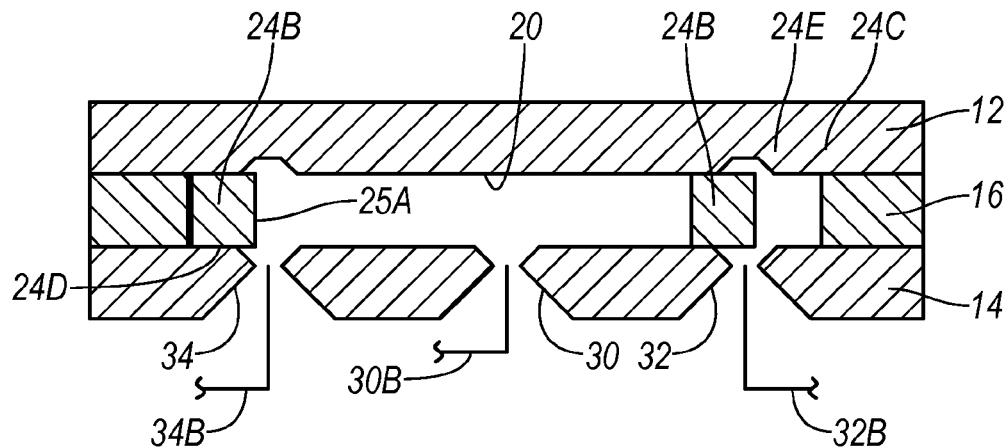
FIG. 3A is a cross-section view of a microvalve shown in FIG. 2 cut along the line 3-3 with the microvalve in a first or non-actuated position.

The following description is merely exemplary in nature and is not intended to limit the present disclosure, application, or uses.

Referring to the drawings, wherein like reference numbers refer to like components, in FIG. 1 a perspective view of a micro-electro-mechanical device (MEMS) 8 is illustrated in the form of a microvalve 10 and will now be described. Various examples of a MEMS microvalve can be found in U.S. Pat. No. 8,011,388 and the disclosure of such is incorporated herein by reference. The microvalve 10 is typically mounted to a manifold (not shown) which facilitates fluid communications between the ports of the microvalve. The microvalve 10 includes a first and a second plate 12, 14 with an intermediate plate 16 sandwiched there between. The first plate 12 of the microvalve includes a pair of electrical contacts 18 adapted for connection to a source of electrical power or the controller (not shown) to selectively supply current to the microvalve 10.

The intermediate plate 16 defines a cavity 20 while a fixed portion 22 of the intermediate plate 16 is fixed to the first and second plates 12, 14. The intermediate plate includes a valve 24, a valve actuator 26, and a hinge 28. The valve 24 is disposed in the cavity 20 of the intermediate plate 16 and is capable of movement between a first position and second position. The valve 24 includes an elongated portion 24A and a blocking portion 24B. The elongated portion 24A of the valve 24 is connected to the fixed portion 22 of the intermediate plate 16 through the hinge 28. In a first example of the present invention shown in FIG. 2A, the blocking portion 24B extends from an end of the elongated portion 24A and includes a first portion 24C, a second portion 24D, and a third portion 24E. The first portion 24C of the blocking portion 24B includes a first pair of convex surfaces 24F which form a first flow chamber 25A. The overlapping portion of 25A over the underlying fluid passage in plate 12 combine to form the effective flow area 34A. The second portion 24D of the blocking portion 24B includes a pair of parallel surfaces 24G that forms a rectangular second flow chamber 25D that is in communication with the first flow chamber 25A. The third portion 24E of the blocking portion 24B includes a second pair of convex surfaces 24H which form a third flow chamber 25E. The overlapping portion of the third flow chamber 25E over the underlying port 32 in plate 12 form the effective flow area 32A. The third flow chamber 25D of the second portion 24D of the blocking portion 24B is in communication with the third flow chamber 25E. Each of the first pair of convex surfaces 24F, the parallel surfaces 24G, and the second pair of convex surfaces 24H are connected to provide one continuous surface.

In another example of the present invention as shown in FIG. 2B, the blocking portion 124B extends from an end of the elongated portion 124A and includes a first portion 124C, a second portion 124D, and a third portion 124E. The first portion 124C of the blocking portion 124B includes a first pair of convex surfaces 124F which form a first flow chamber 125A. The overlapping portion of 125A and the underlying port 34 of plate 12 form an effective flow area 134A. The second portion 124D of the blocking portion 124B includes a pair of parallel surfaces 124G that forms a rectangular second flow chamber 125D that is in communication with the first flow chamber 125A. The third portion 124E of the blocking portion 124B includes a second pair of convex surfaces 124H which form a second flow chamber 125D. The overlapping portion of 125D and the underlying port 132 of plate 12 form an effective flow area 132A. The second flow chamber 125D of the second portion 124D of the blocking portion 124B is in communication with the third flow chamber 125E. Each of the first pair of convex surfaces 124F, the parallel surfaces 124G, and the second pair of convex surfaces 124H are connected to provide one continuous surface.

Figure 3B:
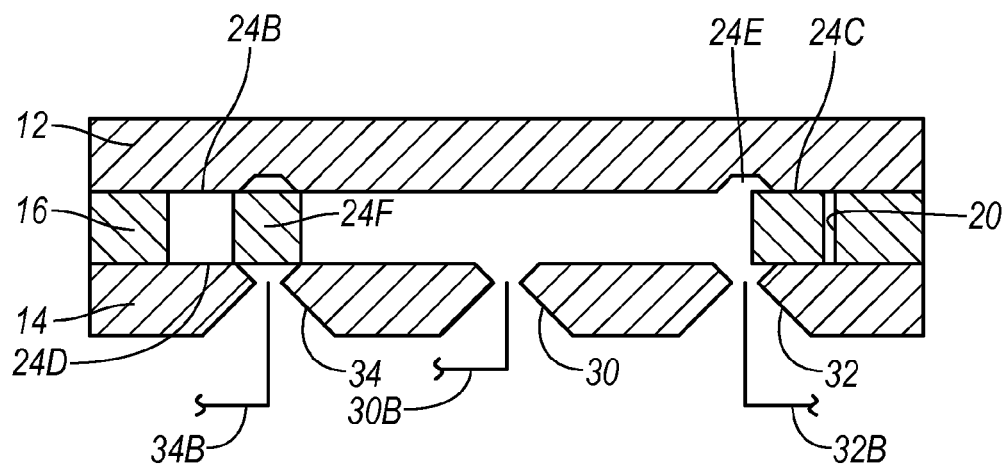
FIG. 3B is a cross-section view of a portion of the microvalve shown in FIG. 2 cut along the line 3-3 with the microvalve in a second or actuated position.

The second plate 14, shown more clearly in FIGS. 3A and 3B, includes a plurality of fluid ports. For example, the second plate 14 of FIG. 3A includes a control port 30, a supply port 32, and an exhaust port 34. The ports 30, 32, 34 are in communication with the cavity 20 of the intermediate plate 16. The first portion 24C of the blocking portion 24B of the valve 24 alternatively blocks and unblocks the supply port 32 from communication with the cavity 20. The ports 30, 32, 34 communicate, for example, with fluid passages in the manifold represented by fluid passages 30B, 32B, 34B, respectively. The blocking portion 24B of the valve 24 alternatively blocks and unblocks the supply port 32 and the exhaust port 34 from communication with the cavity 20.

When the valve 24 is in the first position, as shown in FIG. 3A, the supply port 32 is blocked from communication with the cavity 20 by the blocking portion 24B. Additionally, the first position opens communication between the exhaust port 34 and the cavity 20 as the blocking portion 24B is positioned such that the first flow chamber 25A is in communication with the exhaust port 34. When the valve 24 is in the second position, as shown in FIG. 3B, the exhaust port 34 is blocked from communication with the cavity 20 by the blocking portion 24B. Additionally, the second position opens communication between the supply port 32 and the cavity 20 as the blocking portion 24B is positioned such that the fifth flow chamber 25F is in communication with the supply port 32.

The valve actuator 26 of the intermediate plate 16 selectably moves the valve 24 from the first position to the second position. The actuator includes an elongated spine 26A, a plurality of first ribs 26B and a plurality of second ribs 26C. The spine 26A is fixed to the elongated portion 24A of the valve 24. Each of the plurality of first ribs 26B includes a first end fixed to a first side of the spine 26A and a second end fixed to the fixed portion 22 of the intermediate plate. Each of the plurality of second ribs 26C includes a first end fixed to a second side of the spine 26A and a second end fixed to the fixed portion of the intermediate plate 22. The pluralities of ribs 26B, 26C are designed to thermally expand when placed in contact with an electrical source. The first ends of each of the pluralities of ribs 26B, 26C are in contact with the pair of electrical contacts 18 of the first plate 12. The opposing pluralities of ribs 26B, 26C are arranged at a slight angle to the spine 26A in a herringbone pattern such that when the ribs 26B, 26C elongate, they urge the spine 26A to move toward the valve 24 pushing the elongated portion 24A of the valve 24. The hinge 28 resists the movement of the elongated portion 24A of the valve 24 and the resultant force bends the hinge 28 as the valve 24 pivots to the second position as shown in FIG. 3B. Movement of the valve 24 from the first position to the second position is controlled by the input of an electrical signal to the contacts 18.

Figure 4A:
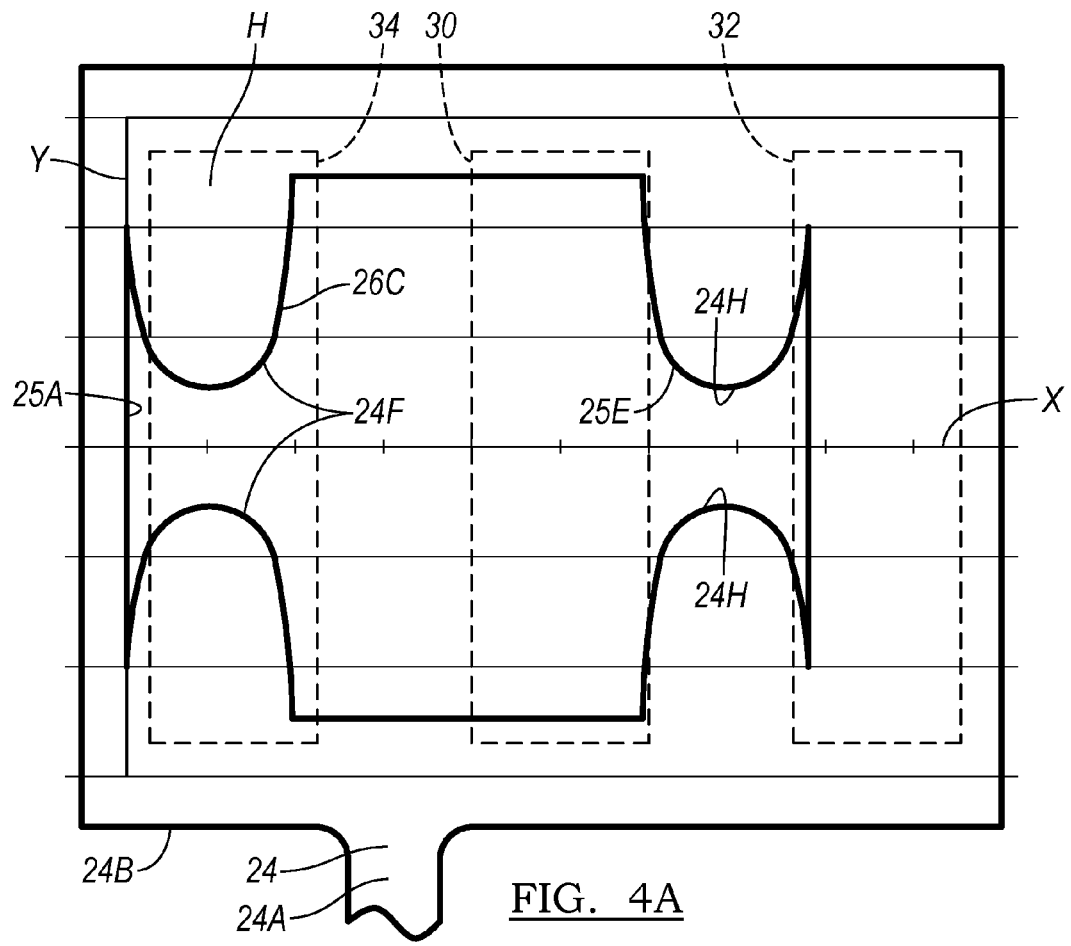
FIG. 4A is a graph displaying an example of a full-curve profile showing the ideal exhaust port opening area and the ideal supply port opening area.

Referring now to FIG. 4A, the profile shape of the blocking portion 24 is graphically illustrated and will now be further described. In this example, the profile is described as a full-curve profile and the area A1 is the area of the supply port 32 that is open to the third flow chamber 25E due to the convex surfaces 24H of the profile. The area A1 is mathematically described as follows:

$$A1 = \frac{H\left(1 - \sqrt{\frac{1}{kX} - 1}\right)}{2 - \frac{1}{kX}},$$

where X is the distance in a direction of movement of the blocking portion and k is a constant and H is the total area of the supply and exhaust ports which is a constant based on a particular set of dimensions for a particular design. Additionally, the following equation is used to determine the area A2 of the exhaust port 34:

$$A2=H-A1.$$

Figure 4B:
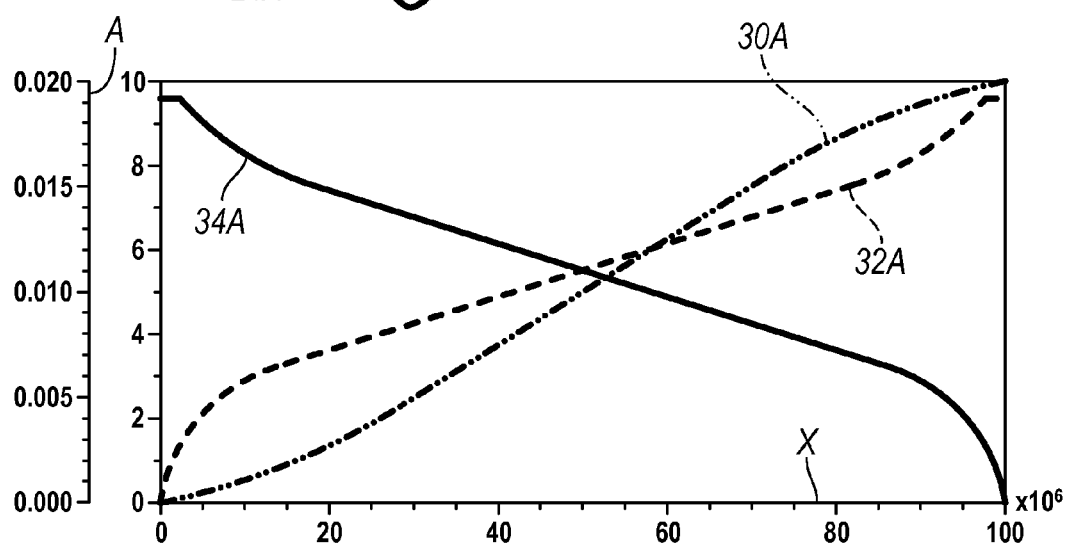
FIG. 4B is a graph displaying the pressure at a control port in response to the flow area of the exhaust and supply ports.

Referring now to FIG. 4B, a graph depicts the flow areas A1 and A2 for the supply port 32A and the exhaust port 34A and the control pressure for the signal port 30A according to the position of the blocking portion 24. Note that while both the supply port and the exhaust port exhibit sharp change in flow area in the beginning and ending portion of the valve stroke, the control pressure 30A of the signal port 30 still increases at a relatively linear rate, which would be otherwise at very low rate with a linear change in flow area. In addition, the gain in the flow area of both the supply port and the exhaust port decreases in the middle portion of the valve stroke, which enables the control pressure 30A to continue to increase at a constant linear rate.

Figure 5A:
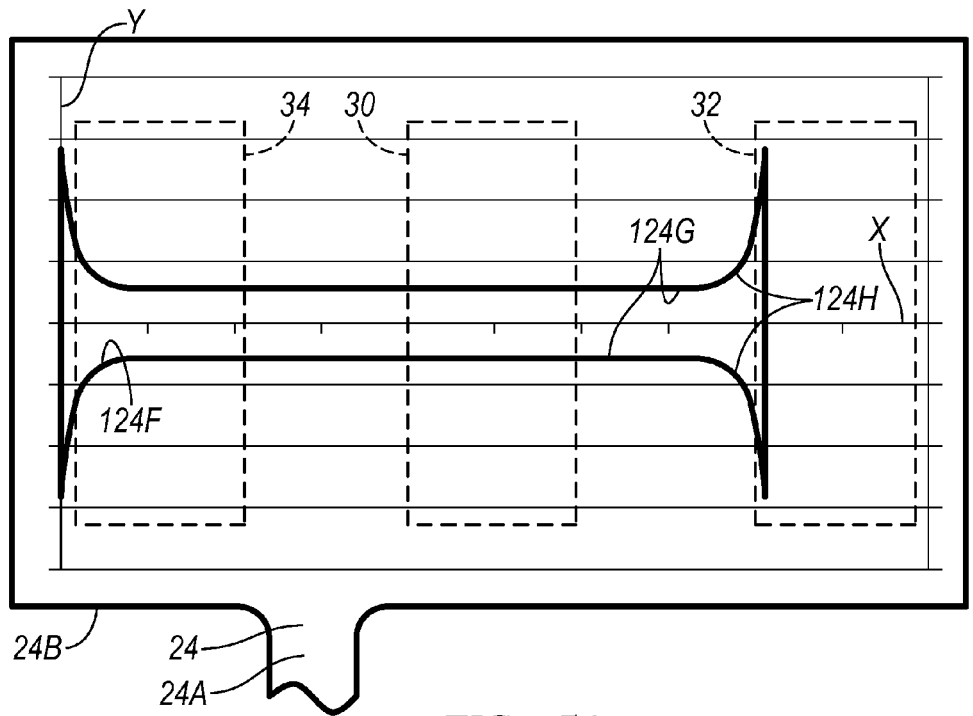
FIG. 5A is a graph displaying an example of a half-curve profile showing an exhaust port opening area and a supply port opening area.

Referring now to FIG. 5A, the profile shape of the blocking portion 124 of FIG. 2B is graphically illustrated and will now be further described. In this example, the profile is described as a half-curve profile and the area A1 is the area of the supply port 32 that is open to the second flow chamber 125D due to the parallel surfaces 124G and the second pair of convex surfaces 124H of the profile. The area A1 open to the supply port 32 is mathematically described as follows:

$$A1 = \frac{H\left(1 - \sqrt{\frac{1}{kX} - 1}\right)}{2 - \frac{1}{kX}},$$

where H is the total area of the supply and exhaust ports which is a constant based on a particular set of dimensions for a particular design. Naturally, the following equation is used to determine the area A2 of the exhaust port 34:

$$A2=H-A1.$$

Figure 5B:
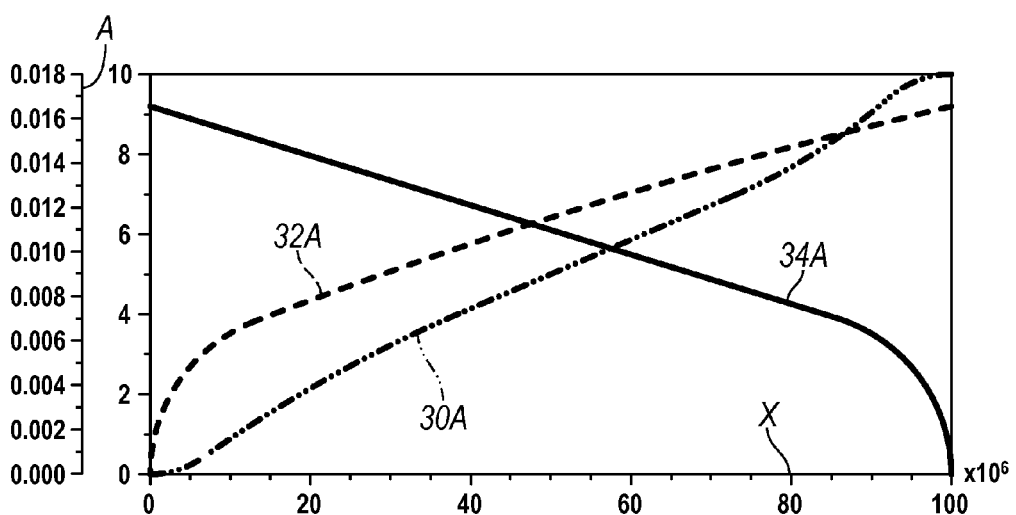
FIG. 5B is a graph displaying the pressure at a control port in response to the flow area of the exhaust and supply ports.

Referring now to FIG. 5B, a graph depicts the flow areas A1 and A2 for the supply port 32A and the exhaust port 34A and the control pressure for the signal port 30A according to the position of the blocking portion 24 for the half-curve profile of FIG. 5A. Note that while both the supply port and the exhaust port exhibit sharp change in flow area in the beginning and ending portion of the valve stroke, the control pressure 30A of the signal port 30 still increases at a relatively linear rate, which would be otherwise at very low rate with a linear change in flow area. In addition, the gain in the flow area of both the supply port and the exhaust port decreases in the middle portion of the valve stroke, which enables the control pressure 30A to continue to increase at a constant linear rate.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A micro-electro-mechanical fluid control device, the device comprising:
a first, a second, and an intermediate plate, wherein the intermediate plate is disposed between the first and second plates, the first plate includes a pair of electrical contact cavities, the second plate includes a first, a second and a third ports, and the intermediate plate includes a valve, a valve cavity, and an actuator; and
wherein the first, second, and third ports are in communication with the valve cavity, the valve is disposed in the cavity, and the valve is connected to the actuator;
wherein the valve includes an elongated portion and a blocking portion and the blocking portion includes a first, a second, and a third portions, and
wherein the first portion of the blocking portion includes a first and a second convex surface and a first planar surface, the first convex surface is opposite the second convex surface and the first and second convex surfaces are connected by the first planar surface.

2. The micro-electro-mechanical fluid control device of claim 1 wherein the second portion of the blocking portion includes a second and third planar surfaces, the second planar surface is connected to the first convex surface, and the third planar surface is connected to the second convex surface.

3. The micro-electro-mechanical fluid control device of claim 2 wherein the third portion of the blocking portion includes a third and fourth convex surfaces and a fourth planar surface, the third convex surface is opposite the fourth convex surface, the third and fourth convex surfaces are connected by the fourth planar surface, the third convex surface is connected to the second planar surface, and the fourth convex surface is connected to the third planar surface.

4. The micro-electro-mechanical fluid control device of claim 1 wherein the first portion of the blocking portion includes a first fluid passage in selective communication with the first port.

5. The micro-electro-mechanical fluid control device of claim 4 wherein the second portion of the blocking portion includes a second fluid passage and the second fluid passage is in communication with the first fluid passage and the second port.

6. The micro-electro-mechanical fluid control device of claim 5 wherein the third portion of the blocking portion includes a third fluid passage, the third fluid passage is in communication with the second fluid passage, and the third fluid passage is in selective communication with the third port.

7. The micro-electro-mechanical fluid control device of claim 1 wherein the first portion of the blocking portion includes a flow area defined by the following equation:

$$A1 = \frac{H\left(1 - \sqrt{\frac{1}{kX} - 1}\right)}{2 - \frac{1}{kX}}$$

wherein H represents a total flow area for the first and second portions, k is a constant for the valve design, and X is the distance in a direction of movement of the blocking portion.

8. The micro-electro-mechanical fluid control device of claim 7 wherein the third portion of the blocking portion includes a flow area defined by the following equation:

$$A2=H-A1.$$

9. A MEMS fluid control system comprising:
a micro-electro-mechanical system, the system including a plurality of ports, a cavity, a valve, an actuator, and a pair of electrical contacts, wherein the plurality of ports are in communication with the cavity, the valve is disposed in the cavity, and the valve is connected to the actuator; and
a hydraulic circuit having a pressure supply line in communication with a first of the plurality of ports, a control line in communication with a second of the plurality of ports, and an exhaust line in communication with a third of the plurality of ports;
wherein the valve includes an elongated portion and a blocking portion, the blocking portion includes a first, a second, and a third portions, and
wherein the first portion of the blocking portion includes a first and a second convex surface and a first planar surface, the first convex surface is opposite the second convex surface, and the first and second convex surfaces are connected by the first planar surface.

10. The MEMS fluid control system of claim 9 wherein the second portion of the blocking portion includes a second and third planar surfaces, the second planar surface is connected to the first convex surface and the third planar surface is connected to the second convex surface.

11. The MEMS fluid control system of claim 10 wherein the third portion of the blocking portion includes a third and fourth convex surfaces and a fourth planar surface, the third convex surface is opposite the fourth convex surface and the third and fourth convex surfaces are connected by the fourth planar surface and the third convex surface is connected to the second planar surface and the fourth convex surface is connected to the third planar surface.

12. The MEMS fluid control system of claim 9 wherein the first portion of the blocking portion includes a first passage, the first fluid passage is in selective communication with the first port.

13. The MEMS fluid control system of claim 12 wherein the second portion of the blocking portion includes a second fluid passage, wherein the second fluid passage is in communication with the first fluid passage and the second port.

14. The MEMS fluid control system of claim 13 wherein the third portion of the blocking portion includes a third fluid passage, the third fluid passage is in communication with the second fluid passage and selective communication with the third port.

15. The MEMS fluid control system of claim 9 wherein a flow area through the first portion of the blocking portion is defined by the following equation:

$$A1 = \frac{H\left(1 - \sqrt{\frac{1}{kX} - 1}\right)}{2 - \frac{1}{kX}}$$

wherein H represents the total flow area for the first and second portions and k is a constant for the valve design, and X is the distance in a direction of movement of the blocking portion.

16. The MEMS fluid control system of claim 15 wherein a flow area through the third portion of the blocking portion is defined by the following equation:

$$A2 = H - A1.$$

* * * * *